United States Patent [19]
Castellano

[11] 3,999,843
[45] Dec. 28, 1976

[54] CARTRIDGE-LOADED SOUND MOTION PICTURE PROJECTION

[75] Inventor: Peter J. Castellano, Deer Park, N.Y.

[73] Assignee: Audio-Optic Corporation, New York, N.Y.

[22] Filed: Feb. 11, 1974

[21] Appl. No.: 441,714

[52] U.S. Cl. .................................. 352/29; 352/128
[51] Int. Cl.² ........................................ G03B 31/02
[58] Field of Search ................ 352/11, 26, 27, 29, 352/30, 72, 239

[56] References Cited
UNITED STATES PATENTS

| | | | |
|---|---|---|---|
| 3,176,310 | 3/1965 | Finnerty | 352/72 X |
| 3,212,837 | 10/1965 | Beyer | 352/72 |
| 3,244,470 | 4/1966 | Hennessey et al. | 352/72 X |
| 3,305,296 | 2/1967 | Nicosia | 352/78 R X |
| 3,404,937 | 10/1968 | Peirez et al. | 352/29 |
| 3,498,703 | 3/1970 | Gerry | 352/72 X |
| 3,502,398 | 3/1970 | Michelson | 352/239 X |
| 3,687,531 | 8/1972 | Bogdanowicz | 352/72 |
| 3,756,714 | 9/1973 | Caraway | 352/27 |
| 3,778,137 | 12/1973 | Castellano et al. | 352/72 |

FOREIGN PATENTS OR APPLICATIONS

| | | | |
|---|---|---|---|
| 15,357 | 4/1912 | France | 352/239 |

Primary Examiner—Fred L. Braun
Attorney, Agent, or Firm—Dressler, Goldsmith, Clement, Gordon & Shore, Ltd.

[57] ABSTRACT

In a continuous film cartridge sound motion picture projector employing a closed loop film which is twisted to cause it to turn over with each passage through the projector, optical sound tracks on the emulsion side of the film are used to modulate a narrow beam of light, and this beam is prefocused on the center of the film while it is pressed against a film positioning element carried by the projector and the modulated beam of light is picked up by a photosensitive element which is carried by the projector and moved into the cartridge upon insertion thereof. This system is made practical by employing a beam of light which has a thickness of from 0.3 – 0.6 mil and which is produced using a single cylindrical lens element to provide a beam having a cone angle which is not more than 25° to provide an adequate depth of focus to accommodate the alternate presentation of the opposite faces of the film when the film is turned over. This provides satisfactory sound reproduction regardless of which side of the film the optical sound track is positioned on as it passes through the projector.

5 Claims, 6 Drawing Figures

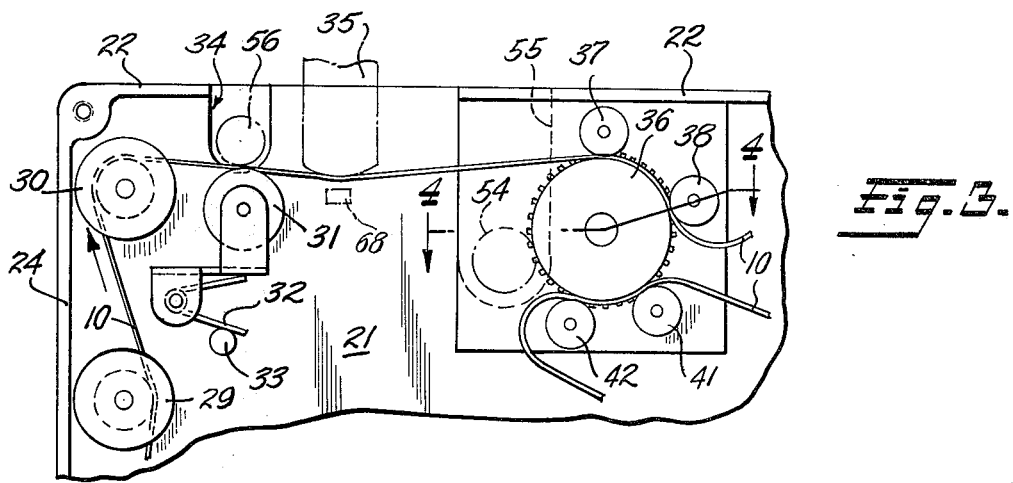
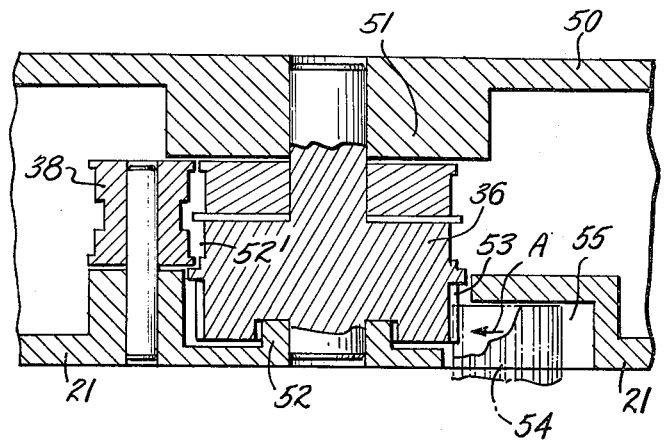
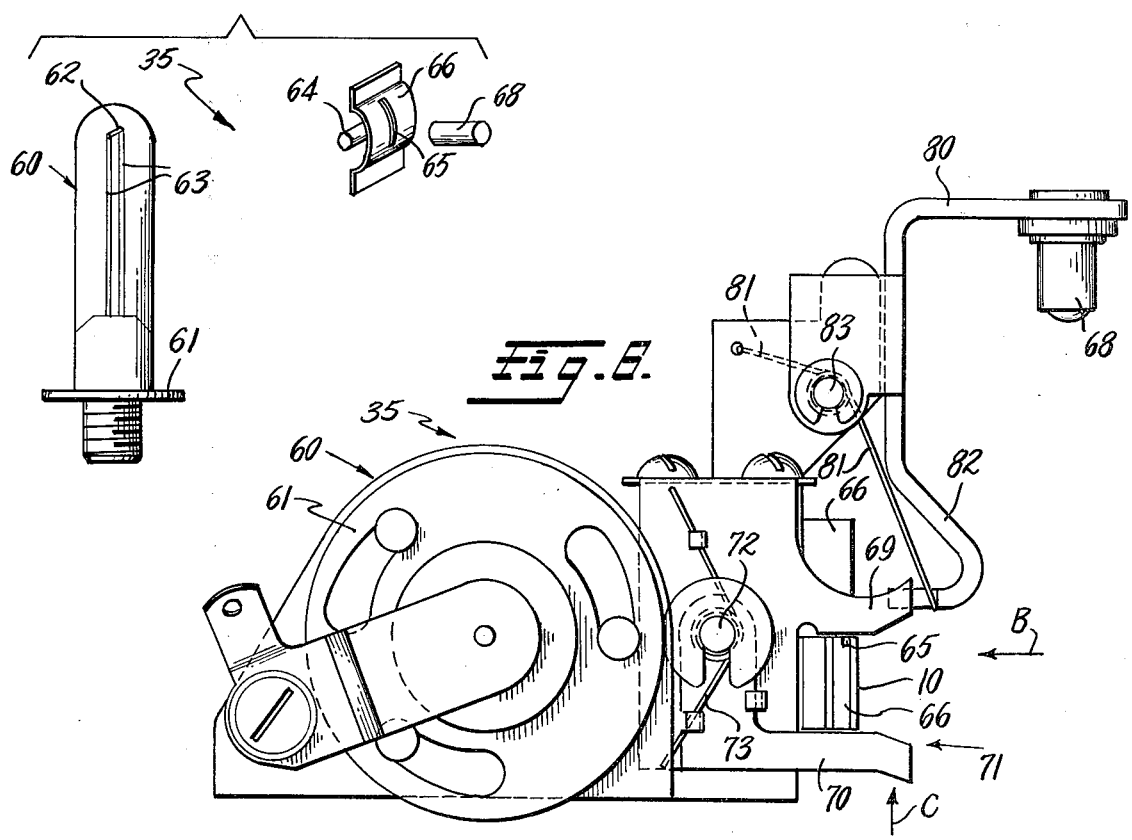

CARTRIDGE-LOADED SOUND MOTION PICTURE PROJECTION

The present invention relates to cartridge loaded sound motion picture projectors which are adapted to form a single continuous sound motion picture presentation using film on which the picture and sound are both recorded on a single emulsion side of the film, and is an improvement on the prior application of myself and Jerry H. Galuten, Ser. No. 65,869, filed Aug. 21, 1970, now abandoned, which application has been divided, and Pat. No. 3,778,137 has issued from one of the divisional applications.

In this invention, as in said prior application, the film is formed into a closed loop which contains a twist so that one side of the film faces forwardly on the first full revolution of the film loop and the other side faces forwardly on the next revolution.

Since the side of the film which faces forwardly changes after each full revolution of the film loop, and since the optical sound track is recorded only on the single emulsion side of the film, one would think that adequate sound reproduction could not be obtained using an optical sound track unless the beam of light used to detect the optical sound track were refocused every time the film is turned over. It is for this reason that said prior application uses a magnetic sound track part of which is on the non-emulsion side of the film.

In this invention, a narrow beam of light to be modulated by the optical sound track is prefocused at the middle of the thickness of the film while the film is pressed against a film positioning means carried by the projector, and the photosensitive element which picks up the modulated beam of light is carried by the projector and moved into the cartridge when the same is inserted into the projector. It has been found that this combination of elements permits good sound reproduction to be obtained regardless of which face of the film is forward (is pressed against the positioning means).

Referring more particularly to the film format, at least two horizontal rows of pictures extend axially on the emulsion side of the film. There is at least one row of pictures on the upper half of the film, and another row of pictures on the lower half of the film, these rows being symmetrically positioned with respect to the axis of the film. The pictures in the upper half of the film are in vertical alignment and are upside down with respect to the pictures in the lower half of the film. The ends of the film are secured together to form a closed loop with one of the ends being rotated with respect to the other so that the two rows of pictures are merged to form a single continuous motion picture presentation.

The film is also provided with optical sound tracks, one for each row of pictures, all of which are on the emulsion side of the film. The sound tracks are also symmetrically positioned with respect to the axis of the film so that they also form a single continuous presentation when the rotated or twisted ends of the closed loop film pass through the projector.

Symmetrically positioned sprocket holes are provided, one hole for each picture in one of the rows of pictures. This combination of pictures, sound tracks, and sprocket holes combine, because the ends of the film have been rotated with respect to each other and secured together to form a closed loop, to provide a continuous sound motion picture film presentation.

The sprocket holes are preferably placed along the longitudinal axis of the film, while the optical sound tracks are preferably placed next to the edges of the film.

The closed loop film is carried in a cartridge housing in which it is advanced continuously and endlessly in one direction, the film advance being altered for optical sound pick-up as will be explained.

The thickness of the film is typically 0.005 inch and when the light is prefocused at the center of the film, the error focus is decreased to 0.0025 inch on both passes of the film. So long as the beam of light is focused within the thickness of the film, this is helpful to obtaining satisfactory tonal reproduction. When such focusing is combined with a beam which is focused to an appropriate thickness through a cone angle, which is sufficiently small, then good tonal reproduction is obtained.

The photosensitive element is carried by the projector in order that it might be inserted behind the film when the cartridge is inserted. The photosensitive element is movably mounted for movement into the cartridge into line with the beam of light which has now been modulated by passage through the optical sound track carried by the film. This is desirably achieved by pivotally mounting the photosensitive element on the projector so that it pivots into and out of position within the cartridge with the insertion and extraction of the cartridge actuating the desired movement. Phototransistors are preferably used to provide the desired photosensitive element, but this is not essential.

A feature of this invention is the provision of a beam of light which is sufficiently narrow and which has adequate depth of field. It is preferred to do this in an economical manner while retaining within the narrowed beam at least about 80% of the light energy received by the optical system employed.

As is customary, the light energy is provided by a conventional exciter lamp which has a transverse resistance element which glows to provide a line source of light energy having a thickness of about 20 mils. This must be narrowed (optically reduced) in order to permit an adequate frequency response in the sound pick-up. Usually, this optical reduction is carried out by a multielement lens system normally using from 6 to 12 lens elements. These multielement lens systems are expensive and also cause an excessive reduction in the beam energy which is retained within the narrowed beam. The usual beam efficiency of a multielement lens system is in the range of 30–60%, normally about 40%.

Since the exciter lamp must be activated by D.C. current, the capacity to achieve beam efficiencies of the order of 80% reduces the A.C. to D.C. electrical conversion requirement, a source of considerable expense in conventional optical sound pick-up systems.

Of greater importance is the fact that the usual angle of beam narrowing (the cone angle) is 35°–45°, and this produces a short depth of field inadequate for satisfactory tonal reproduction when a film with an optical sound track on the emulsion side of the film is reversed from its normal position. As a result, the conventional optical sound track could not be used with conventional optical sound pick-up means when the film is in the form of a Moebius band which alternately presents opposite faces to the optical sound pick-up system.

In this invention, the cone angle is not more than 25°. Such a small cone angle is not provided in conventional optical sound pick-up systems, and it would not be practical using the multielement arrangements of the art.

More particularly, I employ a single cylindrical element of appropriate diameter which is positioned at a distance from the resistance filament of the exciter lamp to produce the desired cone angle and a projected beam width (at the focus) of 0.3 to 0.6 mil. This is done using a cylindrical lens element having a diameter of about 0.080 inch. When the cylinder diameter is less than 0.060 inch, then the cylinder is too small to collect enough light, and the projected beam is not sufficiently intense. Above 0.125, inch, the lens is too large, and the cone angle increases to a point where proper depth of field is not present. Preferred cylinder diameters are from 0.070 inch to 0.090 inch. It will be understood that while cylinders are used, the sides of the cylinder serve little purpose, and it would be possible to remove these.

The distance from the resistance filament to the focal point or plane of the cylindrical lens is also significant and, in preferred practice, with a lens 0.080 inch in diameter, is 1.257 inch. This distance may vary plus or minus 0.125 inch. If the filament is too close to the lens, then the beam efficiency is reduced. If the filament is too far from the lens, then the cylinder receives less light. In either instance, the light intensity of the narrowed beam at the focus is reduced.

With this optical arrangement, the depth of field of the narrowed beam at the focus is large enough to enable good sound pick-up regardless of which face of the film is presented, and this is particularly true when the narrowed beam is focused at the center of the film thickness.

It is also pointed out that the film drive arrangement employed in said U.S. Pat. No. 3,778,137 is particularly adapted to handle film having a magnetic sound track. When the sound track is magnetic, the film drive wheel is positioned in the corner, and the film passes the magnetic sound track before it reaches the drive wheel. While such structure is applicable to a magnetic pick-up, it is not applicable to an optical pick-up system. This is because the geometry and the dynamics required to maintain linear movement of the film past the optical pick-up are not readily available. As a result, I have had to redesign the film drive structure in order to provide an arrangement which is adaptable to an optical pick-up. However, it will be understood that while the patented constuction is not well adapted for optical pick-up, the new structure can be used with either an optical or a magnetic pick-up.

In the new construction, the film is tensioned immediately prior to the sound pick-up station, and this is done by running the film between a capstan and damper. Moreover, and immediately after the sound pick-up station, the film is driven by the drive wheel or sprocket. In order to have the sound pick-up intermediate the drive means, on the one hand, and the tensioning means, on the other hand, the drive wheel is now positioned along the length of the forward face of the cartridge, instead of at the corner as in the patented structure. To accommodate this new positioning, a recess is formed in the undersurface of the cartridge at the forward end thereof to accept entry of the drive pinion carried by the projector along the side of the drive wheel or sprocket. This drive pinion is spring biased toward the drive wheel as in U.S. Pat. No. 3,778,137.

As a result of the new structure, the optical sound pick-up in this invention is carried by the projector and positioned to enter the forward face of the cartridge to bear against the tensioned film intermediate the drive wheel and the tensioner and this automatically positions the film. Also, the optical sound pickup carries a slotted guide at its forward end which bears against the film, and the sound pick-up also carries a forwardly extending rudder assembly. As a result, when the cartridge is fully inserted, the film bears against the slotted guide to be at the proper focal point, and the rudder assembly positions the film so that the sound track is aligned with the slot in the guide.

The invention includes numerous features which will become more apparent from the description which follows, taken in conjunction with the accompanying drawings in which:

FIG. 3 is an enlarged partial view showing the portion of the open cartridge in which the film is tensioned and driven;

FIG. 4 is a detailed cross-section generally along the line 4—4 of FIG. 3;

FIG. 5 is a diagrammatic view illustrating the manner in which the optical sound pick-up functions; and FIG. 6 is a side elevation showing the optical sound pick-up in greater detail.

Figure 1:
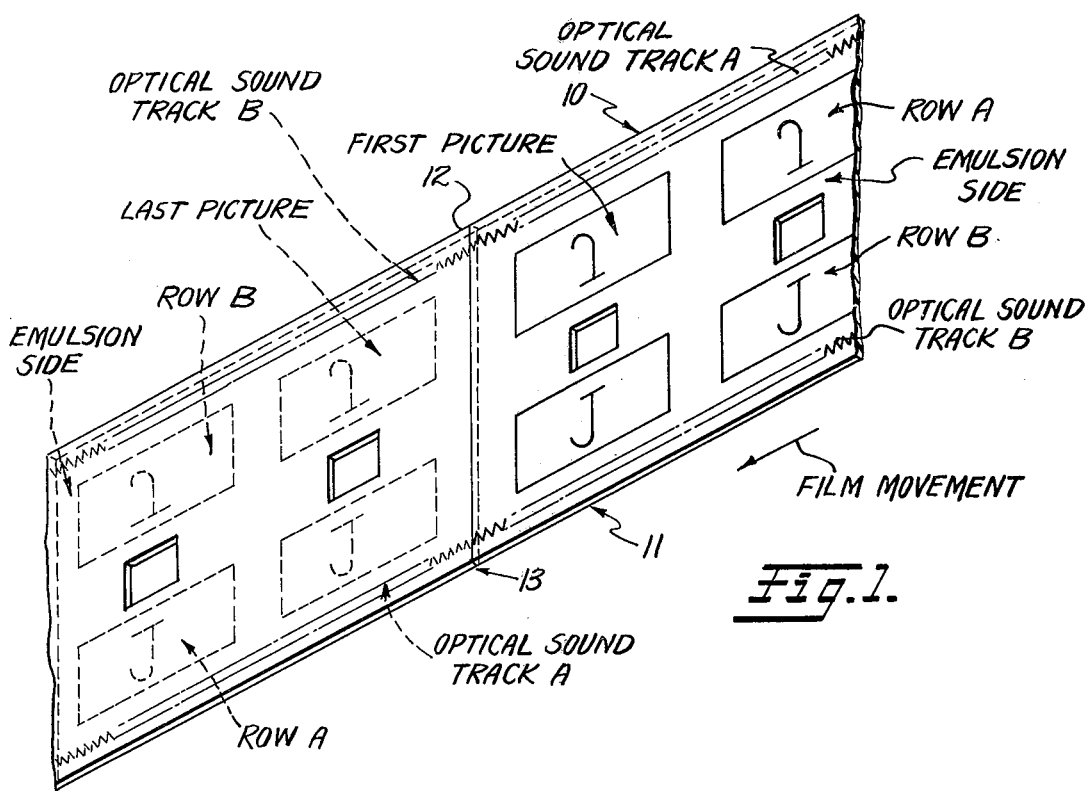
FIG. 1 is a partial perspective view showing the interconnection between opposite ends of an illustrative film constructed in accordance with the invention.

Referring more particularly to the drawings, the film structure used in the invention will be more fully understood from FIG. 1 in which the film identified by numeral 10 has opposite ends 11 and 12 joined together at 13. As will be seen, the end 12 is rotated with respect to end 11 so that the emulsion side of the film on the secured together ends is oppositely disposed at the point of the splice. This involves a rotation of 180° or 540°, etc., as will be apparent.

The emulsion side of the film 10 is formed with two horizontally extending rows of pictures, namely, upper row A and lower row B, these rows being symmetrically positioned with respect to the axis of the film. Each row of pictures is provided with its own associated optical sound track, namely, upper optical track A and lower optical track B. These sound tracks are also symmetrically positioned with respect to the axis of the film.

It will be particularly observed in FIG. 1 that the emulsion side of the film at the point where the film is spliced is on the opposite side as one goes from one side of the splice to the other. As a result, and as shown, the optical sound track alternates from one side to the other, and this creates the problem of this invention.

Figure 2:
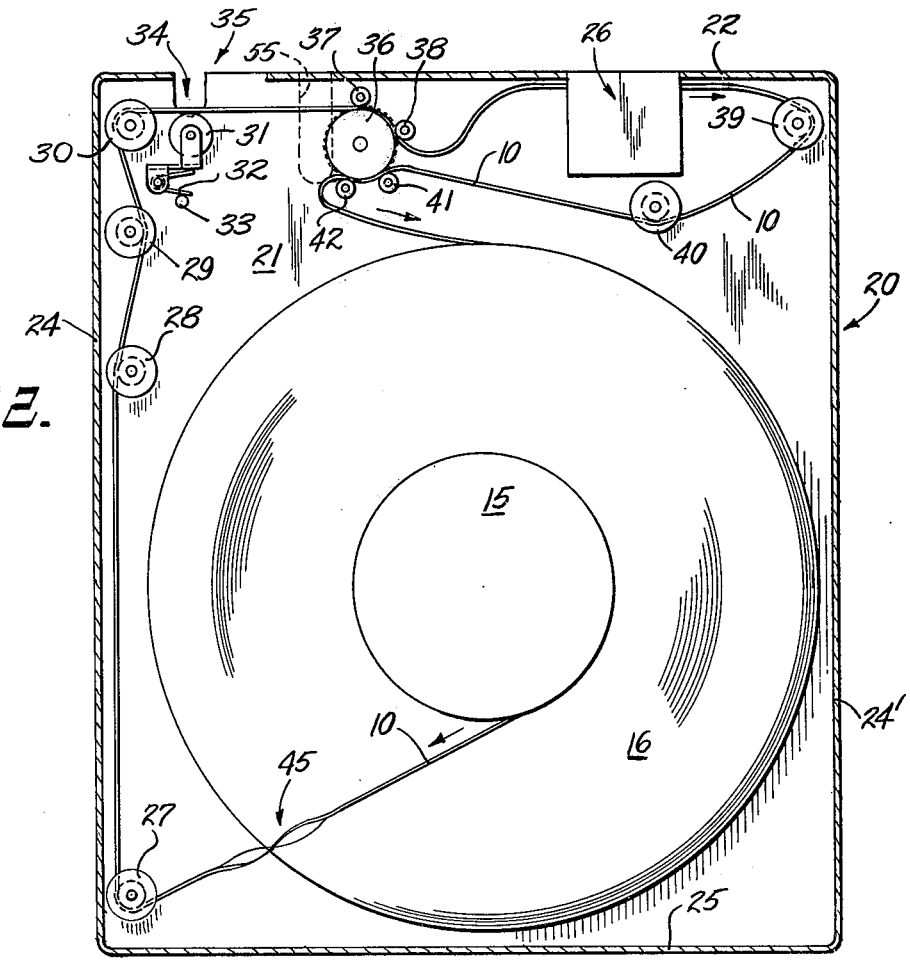
FIG. 2 is a top plan view showing a cartridge constructed in accordance with the invention, but with the top of the cartridge removed to enable the interior structure to be seen, and with a portion of the structure shown diagrammatically.

Referring more particularly to FIG. 2, the continuous film with the rotated secured opposite ends shown in FIG. 1 is disposed in a cartridge 20 which comprises a supporting platform 21, a front wall 22 in which there are various openings as will be explained, side walls 24 and 24', and rear wall 25. There is also generally indicated by the numeral 26 a projection portion of the structure which is the same as that described in U.S. Pat. No. 3,778,137.

Forming part of the platform 21 is a raised core 15 about which the continuous film 10 is reeled, the reel of film being identified at 16.

As can be seen, the film 10 leaves the reel 16, is twisted as indicated at 45, and it then proceeds via rollers 27, 28, 29, and 30, to a film tensioning device. The tensioning device includes a capstan 31 which is spring biased via spring 32 and stop 33 toward a damper-receiving opening 34. The film 10 then moves past a sound pick-up zone indicated generally by the numeral 35, to a sprocket 36 where it passes rollers 37 and 38 before it moves to the projection area 26. On leaving the projection area 26, the film passes rollers 39 and 40 and then returns to the sprocket 36 where it moves past rollers 41 and 42 before being returned to the reel 16. The movement of the film 10 is shown by arrows in FIG. 2.

The driving of the sprocket wheel 36 is more fully shown in the enlarged view in FIG. 3, and also in the detailed cross-section of FIG. 4.

Referring first to FIG. 4, the cartridge 20 is shown with its top 50 superposed over the bottom platform 21, and the drive sprocket 36 is shown journaled in supports 51 and 52. It will be seen that the upper portion of wheel 36 carries the film, see particularly the film-receiving space 52' formed between the upper portion of wheel 36 and roller 38. The lower portion of the sprocket wheel 36 is formed with teeth 53 to form a drive wheel which is driven by a drive pinion 54 which is shown in phantom and which is biased as shown by arrow A. The drive pinion 54 enters the forward wall 22 of cartridge 20 when it is inserted and moves in past the dead center position of wheel 36 via channel 55 formed in a raised portion of platform 21 as can be seen in both FIGS. 3 and 4.

At the same time that the drive pinion 54 enters channel 55, the sound pick-up 35 also enters the cartridge via its front wall where, as shown in FIG. 3, it bears against the film 10 intermediate the drive or sprocket wheel 36 and the tensioning capstan 31. Sound pick-up 35 is shown in phantom as is a damper shaft 56 which is also carried by the projector to enter channel 34 and bear against capstan 31. The damper shaft 56 carries a flywheel so the film is dragged on one side of the pick-up 35 and pulled on the other to cause the film 10 to bear uniformly against the pick-up 35.

The sound pick-up 35 is shown more fully in the diagrammatic view of FIG. 5 and the side elevation of FIG. 6.

From the standpoint of function, an exciter lamp 60 having a base 61 is actuated to form a line of light delineated by filament 62 carried by electrodes 63. This line of light having a width of about 20 mils is received by the cylindrical lens element 64 which narrows the beam and focuses it just past the slit 65 in a slitted film guide 66. As will be evident, the guide 66 is at the forward end of the pick-up 35 and it is this guide which presses against the film 10. The beam of light then passes through the film to be modulated by its optical sound track and the modulated beam is sensed by photosensitive element 68.

In FIG. 6, the relative movement of the film cartridge with respect to the sound pick-up 35 is shown by arrow B, the final position of film 10 being indicated just beyond guide 66 with the sound track portion of the film overlying slit 65. As the film 10 nears guide 66, it is engaged and centered by arms 69 and 70 of a rudder assembly 71, the lower arm 70 being pivoted at 72, and biased by spring 73 to move as shown by arrow C.

It will lastly be seen that the sound pick-up 35 carries the photosensitive element 68 at the end of an arm 80 which is pivotally mounted at 83, and spring biased by means of spring 81 into the elevated position shown in FIG. 6. When the cartridge moves toward the sound pick-up, it engages the lower portion 82 of the arm 80 thereby pivoting the arm and bringing the photosensitive element 68 into the position shown in FIG. 5 where it is directly behind the film 10 in position to receive the modulated beam of light which passes through slit 65 and then through the sound track on film 10.

It is desired to point out that the action of the drive pinion, the claw drive for the film, and the manner in which the fully inserted cartridge actuates a microswitch carried by the projector, are all more fully shown in said U.S. Pat. No. 3,778,137.

The invention is defined in the claims which follow.

I claim:

1. A sound motion picture projector adapted to pick up sound which is optically recorded on one side of a motion picture film having thickness regardless of which side of the film is presented to an optical pick up means comprising, means to provide a narrow beam of light to be modulated by an optical sound track recorded on said film, a film positioning means for receiving and holding said film at a given point in the path of said beam of light, prefocused means for focusing said beam of light through a cone angle which does not exceed 25° into a narrow band having a thickness of from 0.3 –0.6 mil, the focus of said prefocused means being within the thickness of said film when said film is held against said film positioning means, and a photosensitive element positioned to pick up the modulated beam of light which passes through said film, whereby satisfactory sound reproduction can be obtained regardless of which side of the film the optical sound track is positioned on when it is received by said film positioning means.

2. A combination as recited in claim 1 in which the beam of light which is narrowed is provided by an exciter lamp having a filament which provides a line of light having a thickness of the order of 20 mils in thickness.

3. A combination as recited in claim 2 in which the beam of light is narrowed employing a single cylindrical lens element having a diameter of from 0.060 to 0.125 which is positioned at a distance from the filament such that the distance from the filament to the focal point is 1.257 inch ± 0.125 inch.

4. A combination as recited in claim 3 in which said cylinder diameter is in the range of 0.070 to 0.090.

5. A combination as recited in claim 1, in which said film positioning means includes a slotted guide which bears against the film to hold the focus within the thickness of the film and a forwardly extending rudder assembly which laterally positions the film so that the sound track on the film overlies the slot in said guide.

* * * * *

UNITED STATES PATENT OFFICE
CERTIFICATE OF CORRECTION

PATENT NO. : 3,999,843
DATED : December 28, 1976
INVENTOR(S) : Peter J. Castellano It is certified that error appears in the above-identified patent and that said Letters Patent are hereby corrected as shown below:

Claim 3, line 3, "0.060 to 0.125 " should read --0.060" to 0.125"

Claim 4, line 2, "0.070 to 0.090 " should read -- 0.070" to 0.090"

Claim 5, line 1, "1,in" should read -- 1 in--

Signed and Sealed this

Tenth Day of May 1977

[SEAL]

Attest:

RUTH C. MASON
Attesting Officer

C. MARSHALL DANN
Commissioner of Patents and Trademarks